US011072039B2

(12) United States Patent
Graham et al.

(10) Patent No.: US 11,072,039 B2
(45) Date of Patent: *Jul. 27, 2021

(54) SYSTEMS AND METHODS FOR ADDITIVE MANUFACTURING

(71) Applicant: General Electric Company, Schenectady, NY (US)

(72) Inventors: Michael Evans Graham, Slingerlands, NY (US); Thomas Charles Adcock, Glenville, NY (US); John Joseph Madelone, Jr., South Glens Falls, NY (US); John Broddus Deaton, Jr., Niskayuna, NY (US)

(73) Assignee: General Electric Company, Schenetady, NY (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/007,272

(22) Filed: Jun. 13, 2018

(65) Prior Publication Data

US 2019/0381604 A1 Dec. 19, 2019

(51) Int. Cl.
*B23K 26/354* (2014.01)
*B33Y 10/00* (2015.01)
(Continued)

(52) U.S. Cl.
CPC ............ *B23K 26/354* (2015.10); *B23K 26/34* (2013.01); *B33Y 10/00* (2014.12); *B33Y 30/00* (2014.12); *B33Y 50/02* (2014.12)

(58) Field of Classification Search
CPC ......... B33Y 10/00; B33Y 50/02; B33Y 30/00; B23K 26/354; B23K 26/34
(Continued)

(56) References Cited

U.S. PATENT DOCUMENTS 5,105,062 A * 4/1992 Jones ................. B23K 26/0604
219/121.85
5,155,324 A * 10/1992 Deckard ................. B22F 3/004
264/497

(Continued)

FOREIGN PATENT DOCUMENTS

EP 3007881 A1 4/2016
EP 3028841 A1 6/2016
(Continued)

OTHER PUBLICATIONS

International Search Report and Written Opinion, dated Sep. 12, 2019, for related International application No. PCT/US2019/036905 (13 pgs.).

*Primary Examiner* — Jimmy Chou
(74) *Attorney, Agent, or Firm* — Dority & Manning, P.A.

(57) ABSTRACT

A method of fabricating a component is provided. The method includes depositing particles onto a build platform. The method also includes distributing the particles to form a build layer. The method further includes operating a consolidation device to consolidate a first plurality of particles along a scan path to form a component. The component includes a top surface spaced apart from the build platform and an outer surface. The outer surface extends between the build platform and the top surface, and at least a portion of the outer surface faces a substantially particle-free region of the build platform.

11 Claims, 5 Drawing Sheets

(51) Int. Cl.
   *B33Y 30/00*        (2015.01)
   *B33Y 50/02*        (2015.01)
   *B23K 26/34*        (2014.01)

(58) Field of Classification Search
   USPC .................................................. 219/121.66
   See application file for complete search history.

(56) References Cited

U.S. PATENT DOCUMENTS

| | | | | |
|---|---|---|---|---|
| 5,354,414 | A * | 10/1994 | Feygin | B29C 41/36 |
| | | | | 216/34 |
| 7,586,061 | B2 * | 9/2009 | Hoebel | B23K 26/032 |
| | | | | 219/121.83 |
| 7,798,929 | B2 * | 9/2010 | Takamoto | B62M 25/08 |
| | | | | 474/80 |
| 8,893,371 | B2 * | 11/2014 | Earlier | G05B 19/4099 |
| | | | | 29/512 |
| 9,643,360 | B2 * | 5/2017 | Kashani-Shirazi | |
| | | | | B29C 64/165 |
| 9,694,541 | B2 | 7/2017 | Pruett et al. | |
| 9,751,260 | B2 | 9/2017 | Dietrich et al. | |
| 9,925,715 | B2 * | 3/2018 | Cheverton | B29C 64/393 |
| 9,956,612 | B1 | 5/2018 | Redding et al. | |
| 10,252,336 | B2 * | 4/2019 | Buller | B28B 17/0081 |
| 10,335,901 | B2 * | 7/2019 | Ferrar | B23K 26/144 |
| 10,413,968 | B2 * | 9/2019 | Pialot | B22F 3/003 |
| 10,479,020 | B2 * | 11/2019 | Madigan | B23K 26/082 |
| 10,618,111 | B2 * | 4/2020 | DeMuth | B22F 3/24 |
| 2004/0099983 | A1 | 5/2004 | Dirscherl | |
| 2004/0198028 | A1 * | 10/2004 | Tanaka | B23K 26/0736 |
| | | | | 438/487 |
| 2004/0222197 | A1 * | 11/2004 | Hiramatsu | B23K 26/067 |
| | | | | 219/121.7 |
| 2005/0139582 | A1 * | 6/2005 | Tanaka | H01L 21/02672 |
| | | | | 219/121.75 |
| 2006/0243713 | A1 * | 11/2006 | Sato | G02B 26/10 |
| | | | | 219/121.68 |
| 2007/0108170 | A1 * | 5/2007 | Costin, Sr. | B23K 26/082 |
| | | | | 219/121.85 |
| 2007/0221639 | A1 * | 9/2007 | Yoshikawa | B23K 26/032 |
| | | | | 219/121.63 |
| 2010/0264302 | A1 * | 10/2010 | Philippi | B29C 64/268 |
| | | | | 250/252.1 |
| 2011/0278773 | A1 * | 11/2011 | Bokodi | B33Y 10/00 |
| | | | | 264/497 |
| 2012/0132627 | A1 * | 5/2012 | Wescott | B23K 26/342 |
| | | | | 219/121.66 |
| 2012/0237745 | A1 * | 9/2012 | Dierkes | A61K 6/818 |
| | | | | 428/215 |
| 2013/0108460 | A1 * | 5/2013 | Szwedowicz | B22F 3/1055 |
| | | | | 416/241 R |
| 2013/0316185 | A1 * | 11/2013 | Evangelista | B23K 26/40 |
| | | | | 428/601 |
| 2014/0034622 | A1 * | 2/2014 | Barrett | B23K 33/004 |
| | | | | 219/121.64 |
| 2014/0183173 | A1 * | 7/2014 | Yeum | B23K 26/24 |
| | | | | 219/121.63 |
| 2014/0202742 | A1 * | 7/2014 | Jones | B23K 26/0619 |
| | | | | 174/253 |
| 2014/0245608 | A1 * | 9/2014 | Morimoto | B23K 26/1224 |
| | | | | 29/890.1 |
| 2014/0263209 | A1 | 9/2014 | Burris et al. | |
| 2014/0263222 | A1 * | 9/2014 | Tseng | B23K 26/355 |
| | | | | 219/121.76 |
| 2014/0348691 | A1 * | 11/2014 | Ljungblad | B22F 3/1055 |
| | | | | 419/53 |
| 2014/0348692 | A1 * | 11/2014 | Bessac | B29C 64/141 |
| | | | | 419/53 |
| 2015/0064048 | A1 * | 3/2015 | Bessac | B33Y 30/00 |
| | | | | 419/29 |
| 2015/0158111 | A1 * | 6/2015 | Schwarze | B23K 26/34 |
| | | | | 219/121.34 |
| 2015/0165547 | A1 * | 6/2015 | Lin | F23R 3/002 |
| | | | | 60/752 |
| 2015/0210013 | A1 * | 7/2015 | Teulet | B29C 64/135 |
| | | | | 264/497 |
| 2015/0298253 | A1 * | 10/2015 | Costin, Jr. | D06P 5/15 |
| | | | | 219/121.68 |
| 2015/0343561 | A1 * | 12/2015 | Miller | B23K 26/082 |
| | | | | 219/121.81 |
| 2015/0352786 | A1 | 12/2015 | Pruett et al. | |
| 2015/0375456 | A1 * | 12/2015 | Cheverton | B29C 64/393 |
| | | | | 264/406 |
| 2016/0016255 | A1 * | 1/2016 | Bruck | G01B 11/16 |
| | | | | 219/76.14 |
| 2016/0067820 | A1 | 3/2016 | Mironets et al. | |
| 2016/0107386 | A1 | 4/2016 | Hartmann et al. | |
| 2016/0114432 | A1 * | 4/2016 | Ferrar | B29C 64/393 |
| | | | | 219/76.12 |
| 2016/0121430 | A1 * | 5/2016 | Deiss | B23K 26/354 |
| | | | | 219/76.12 |
| 2016/0136730 | A1 * | 5/2016 | McMurtry | G02B 26/101 |
| | | | | 425/162 |
| 2016/0136731 | A1 | 5/2016 | McMurtry et al. | |
| 2016/0144571 | A1 * | 5/2016 | Philippi | B29C 64/386 |
| | | | | 264/497 |
| 2016/0199201 | A1 * | 7/2016 | Weiss | A61F 2/2814 |
| | | | | 623/32 |
| 2016/0318129 | A1 * | 11/2016 | Hu | B29C 64/153 |
| 2016/0347001 | A1 * | 12/2016 | Katakura | B22F 3/1055 |
| 2017/0036404 | A1 | 2/2017 | Rengers et al. | |
| 2017/0197278 | A1 * | 7/2017 | Garry | B29C 64/20 |
| 2017/0203517 | A1 * | 7/2017 | Crear | B29C 64/393 |
| 2017/0271843 | A1 | 9/2017 | Batchelder et al. | |
| 2017/0282244 | A1 * | 10/2017 | Mizuno | B33Y 50/02 |
| 2017/0326791 | A1 | 11/2017 | Abbott et al. | |
| 2017/0341180 | A1 | 11/2017 | Zediker et al. | |
| 2017/0361404 | A1 * | 12/2017 | Huang | C23C 24/10 |
| 2018/0079003 | A1 * | 3/2018 | Lin | B23K 26/046 |
| 2018/0093416 | A1 * | 4/2018 | Prexler | B29C 64/268 |
| 2018/0185963 | A1 * | 7/2018 | Ostroverkhov | B22F 3/1055 |
| 2018/0186082 | A1 * | 7/2018 | Randhawa | B23K 26/062 |
| 2018/0207750 | A1 * | 7/2018 | Carter | B33Y 50/02 |
| 2018/0250744 | A1 * | 9/2018 | Symeonidis | B23K 15/02 |
| 2018/0250770 | A1 * | 9/2018 | Graham | B23K 26/082 |
| 2018/0264726 | A1 * | 9/2018 | Shiomi | B23K 26/352 |
| 2018/0345405 | A1 * | 12/2018 | Ostroverkhov | B29C 64/153 |
| 2018/0370144 | A1 * | 12/2018 | Revanur | B22F 3/008 |
| 2019/0118481 | A1 * | 4/2019 | Brown | B22F 3/1055 |
| 2019/0143408 | A1 * | 5/2019 | Graham | B33Y 10/00 |
| | | | | 419/53 |
| 2019/0151945 | A1 * | 5/2019 | Okazaki | B33Y 30/00 |
| 2019/0160539 | A1 * | 5/2019 | Lei | B33Y 30/00 |
| 2019/0160735 | A1 * | 5/2019 | Prakash | B29C 64/393 |
| 2019/0232428 | A1 * | 8/2019 | Roychowdhury | B22F 3/1055 |
| 2019/0240732 | A1 * | 8/2019 | Koch | B29C 64/153 |
| 2019/0263057 | A1 * | 8/2019 | Beetz | B22F 3/008 |
| 2019/0283332 | A1 * | 9/2019 | Brown | B33Y 50/02 |
| 2019/0291211 | A1 * | 9/2019 | Tsuno | B33Y 30/00 |
| 2020/0016820 | A1 * | 1/2020 | Penny | B29C 64/393 |
| 2020/0055144 | A1 * | 2/2020 | Poprawe | B33Y 50/02 |
| 2020/0061917 | A1 * | 2/2020 | Osborn | H01S 3/0071 |

FOREIGN PATENT DOCUMENTS

| | | |
|---|---|---|
| EP | 3127636 A1 | 2/2017 |
| EP | 3221073 A2 | 9/2017 |
| WO | 2016198885 A1 | 12/2016 |
| WO | 2017085468 A1 | 5/2017 |
| WO | 2017085470 A1 | 5/2017 |
| WO | 2017096050 A1 | 6/2017 |
| WO | 2017157851 A1 | 9/2017 |
| WO | 2017194177 A1 | 11/2017 |
| WO | 2017196327 A1 | 11/2017 |
| WO | 2018017082 A1 | 1/2018 |

* cited by examiner

SYSTEMS AND METHODS FOR ADDITIVE MANUFACTURING

BACKGROUND

The subject matter described herein relates generally to additive manufacturing systems and, more particularly, to additive manufacturing systems for forming components at least partially surrounded by a particulate-free region.

At least some additive manufacturing systems involve the consolidation of a particulate material to fabricate a component. Such techniques facilitate producing complex components from expensive materials at a reduced cost and with improved manufacturing efficiency. At least some known additive manufacturing systems, such as Direct Metal Laser Melting (DMLM), Selective Laser Melting (SLM), Direct Metal Laser Sintering (DMLS), and LaserCusing® systems, fabricate components using a focused energy source, such as a laser device or an electron beam generator, a build platform, and a particulate bed containing a particulate, such as, without limitation, a powdered metal. (LaserCusing is a registered trademark of Concept Laser GmbH of Lichtenfels, Germany.) In at least some DMLM systems, a recoat device is used to recoat the component with particulate material after each build layer is scanned by the laser beam. However, in at least some known systems, the volume of particulate material required to ensure complete and consistent recoating of the component in a one-size-fits-all particulate bed can be quite large and may result in substantial particulate material waste at a substantial cost to the operator of the additive manufacturing system.

BRIEF DESCRIPTION

In one aspect, a method of fabricating a component is provided. The method includes depositing particles onto a build platform. The method also includes distributing the particles to form a build layer. The method further includes operating a consolidation device to consolidate a first plurality of particles along a scan path to form a component. The component includes a top surface spaced apart from the build platform and an outer surface. The outer surface extends between the build platform and the top surface, and at least a portion of the outer surface faces a substantially particle-free region of the build platform.

In another aspect, an additive manufacturing system is provided. The additive manufacturing system includes at least one consolidation device configured to direct at least one energy beam to generate a melt pool in a build layer of particles, a build platform, and a component formed on the build platform. The component includes a first plurality of particles consolidated together including a top surface spaced apart from the build platform and an outer surface. The outer surface extends between the build platform and the top surface, and at least a portion of the outer surface faces a substantially particle-free region of the build platform.

In yet another aspect, a controller for use in an additive manufacturing system is provided. The additive manufacturing system includes at least one consolidation device configured to consolidate at least a portion of a plurality of particles on a build platform. The controller includes a processing device and a memory device coupled to the processing device. The controller is configured to receive a build file, the build file defining a plurality of scan paths for a plurality of build layers for a component. The controller is also configured to control the consolidation device, based on the build file, to consolidate a first plurality of particles along a scan path of the plurality of scan paths to form at least a portion of the component. The component includes a top surface spaced apart from the build platform and an outer surface. The outer surface extends between the build platform and the top surface, and at least a portion of the outer surface faces a substantially particle-free region of the build platform.

DRAWINGS

These and other features, aspects, and advantages of the present disclosure will become better understood when the following detailed description is read with reference to the accompanying drawings in which like characters represent like parts throughout the drawings, wherein.

Figure 1:
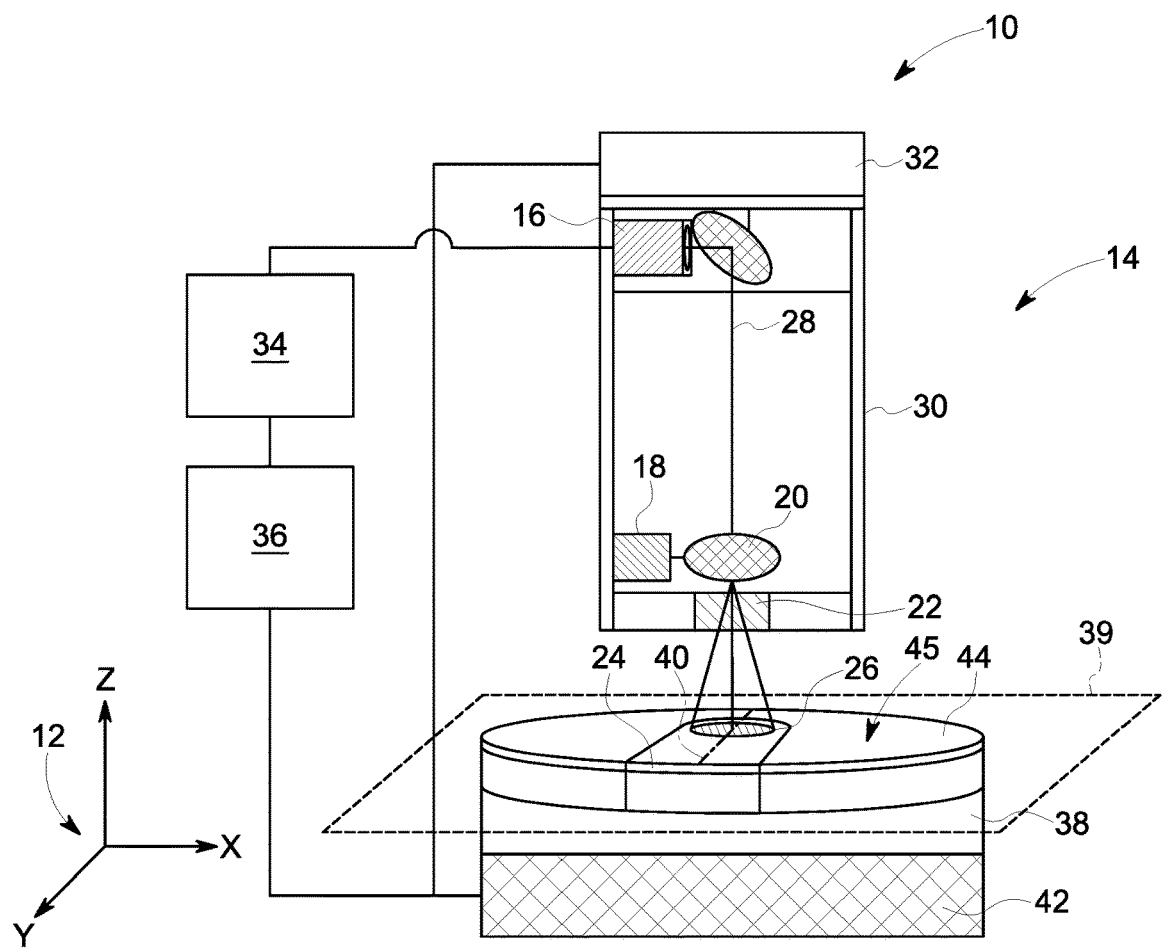
FIG. 1 is a schematic view of an exemplary additive manufacturing system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "substantially particle-free region" refers to any non-constrained portion of a build platform wherein the number of particles deposited thereon is insubstantial enough that it is not intended to be used in a build process of an additive manufacturing system. In other words, a substantially particle-free region of a build platform may contain any quantity of particles resulting from spill-over of particles from within an additively manufactured structure and not constrained by a portion of the additive manufacturing system. However, a substantially particle-free region does not contain a sufficient quantity of particles such that the particles are intended to be used in the build process of an additive manufacturing system. Specifically, a substantially particle-free region may not contain a quantity of particles intended to be consolidated by a consolidation device to form a component in an additive manufacturing system.

The systems and methods described herein include an additive manufacturing system including at least one consolidation device configured to direct at least one energy beam to generate a melt pool in a layer of particles, a build platform, and a component formed on the build platform. The component includes a top surface spaced apart from the build platform and an outer surface. The outer surface extends between the build platform and the top surface, and at least a portion of the outer surface faces a substantially particle-free region of the build platform. In some embodiments, a build layer retainer is configured to retain at least a portion of the build layer along the top surface of the component. The additive manufacturing system and the configuration of the component facilitates improving additively manufacturing components without surrounding an outer face of the component with particles to facilitate improving the quality of an additively manufacturing component and reducing the cost to additively manufacture the component.

Additive manufacturing processes and systems include, for example, and without limitation, vat photopolymerization, powder bed fusion, binder jetting, material jetting, sheet lamination, material extrusion, directed energy deposition and hybrid systems. These processes and systems include, for example, and without limitation, SLA—Stereolithography Apparatus, DLP—Digital Light Processing, 3SP—Scan, Spin, and Selectively Photocure, CLIP—Continuous Liquid Interface Production, SLS—Selective Laser Sintering, DMLS—Direct Metal Laser Sintering, SLM—Selective Laser Melting, EBM—Electron Beam Melting, SHS—Selective Heat Sintering, MJF—Multi-Jet Fusion, 3D Printing, Voxeljet, Polyjet, SCP—Smooth Curvatures Printing, MJM—Multi-Jet Modeling Projet, LOM—Laminated Object Manufacture, SDL—Selective Deposition Lamination, UAM—Ultrasonic Additive Manufacturing, FFF—Fused Filament Fabrication, FDM—Fused Deposition Modeling, LMD—Laser Metal Deposition, LENS—Laser Engineered Net Shaping, DMD—Direct Metal Deposition, Hybrid Systems, and combinations of these processes and systems. These processes and systems may employ, for example, and without limitation, all forms of electromagnetic radiation, heating, sintering, melting, curing, binding, consolidating, pressing, embedding, and combinations thereof.

Additive manufacturing processes and systems employ materials including, for example, and without limitation, polymers, plastics, metals, ceramics, sand, glass, waxes, fibers, biological matter, composites, and hybrids of these materials. These materials may be used in these processes and systems in a variety of forms as appropriate for a given material and the process or system, including, for example, and without limitation, as liquids, solids, powders, sheets, foils, tapes, filaments, pellets, liquids, slurries, wires, atomized, pastes, and combinations of these forms.

FIG. 1 is a schematic view of an exemplary additive manufacturing system 10. A coordinate system 12 includes an X-axis, a Y-axis, and a Z-axis. In the exemplary embodiment, additive manufacturing system 10 includes a consolidation device 14 including a laser device 16, a scanning motor 18, a scanning mirror 20, and a scanning lens 22 for fabricating a component 24 using a layer-by-layer manufacturing process. Alternatively, consolidation device 14 may include any component that facilitates consolidation of a material using any of the processes and systems described herein. Laser device 16 provides a high-intensity heat source configured to generate a melt pool 26 (not shown to scale) in a powdered material using an energy beam 28. Laser device 16 is contained within a housing 30 that is coupled to a mounting system 32. In alternative embodiments, consolidation device 14 may include any number of laser devices 16 coupled to a mounting system in any configuration that facilitates operation of additive manufacturing system 10 as described herein. Additive manufacturing system 10 also includes a computer control system, or controller 34.

Mounting system 32 is moved by an actuator or an actuator system 36 that is configured to move mounting system 32 in the X-direction, the Y-direction, and the Z-direction to cooperate with scanning mirror 20 to facilitate fabricating a layer of component 24 within additive manufacturing system 10. For example, and without limitation, mounting system 32 is pivoted about a central point, moved in a linear path, a curved path, and/or rotated to cover a portion of the powder on a build platform 38 to facilitate directing energy beam 28 along the surface of a plurality of particles 45 of a build layer 44 to form a layer of component 24. Alternatively, at least one of housing 30, energy beam 28, and build platform 38 is moved in any orientation and manner that enables additive manufacturing system 10 to function as described herein.

Scanning motor 18 is controlled by controller 34 and is configured to move mirror 20 such that energy beam 28 is reflected to be incident along a predetermined path along build platform 38, such as, for example, and without limitation, a linear and/or rotational scan path 40. In the exemplary embodiment, the combination of scanning motor 18 and scanning mirror 20 forms a two-dimension scan galvanometer. Alternatively, scanning motor 18 and scanning mirror 20 may include a three-dimension (3D) scan galvanometer, dynamic focusing galvanometer, and/or any other method that may be used to deflect energy beam 28 of laser device 16.

In the exemplary embodiment, build platform 38 defines a build platform plane 39 and is mounted to a support structure 42, which is moved by actuator system 36. As described above with respect to mounting system 32, actuator system 36 is also configured to move support structure 42 in a Z-direction (i.e., normal to a top surface of build platform 38). In some embodiments, actuator system 36 is also configured to move support structure 42 in the XY plane. For example, and without limitation, in an alternative embodiment where housing 30 is stationary, actuator system 36 moves support structure 42 in the XY plane to cooperate with scanning motor 18 and scanning mirror 20 to direct energy beam 28 of laser device 16 along scan path 40 about build platform 38. In the exemplary embodiment, actuator system 36 includes, for example, and without limitation, a linear motor(s), a hydraulic and/or pneumatic piston(s), a screw drive mechanism(s), and/or a conveyor system.

In the exemplary embodiment, additive manufacturing system 10 is operated to fabricate component 24 from a computer modeled representation of the 3D geometry of component 24. The computer modeled representation may be produced in a computer aided design (CAD) or similar file. The CAD file of component 24 is converted into a layer-by-layer format that includes a plurality of build parameters for each layer of component 24, for example, a build layer 44 of component 24 including a plurality of particles 45 to be consolidated by additive manufacturing system 10. In the exemplary embodiment, component 24 is modeled in a desired orientation relative to the origin of the coordinate system used in additive manufacturing system 10. The geometry of component 24 is sliced into a stack of layers of a desired thickness, such that the geometry of each layer is an outline of the cross-section through component 24 at that particular layer location. Scan paths 40 are generated across the geometry of a respective layer. The build parameters are applied along scan path 40 to fabricate that layer of component 24 from particles 45 used to construct component 24. The steps are repeated for each respective layer of component 24 geometry. Once the process is completed, an electronic computer build file (or files) is generated, including all of the layers. The build file is loaded into controller 34 of additive manufacturing system 10 to control the system during fabrication of each layer.

After the build file is loaded into controller 34, additive manufacturing system 10 is operated to generate component 24 by implementing the layer-by-layer manufacturing process, such as a direct metal laser melting method. The exemplary layer-by-layer additive manufacturing process does not use a pre-existing article as the precursor to the final component, rather the process produces component 24 from a raw material in a configurable form, such as particles 45. For example, and without limitation, a steel component can be additively manufactured using a steel powder. Additive manufacturing system 10 enables fabrication of components, such as component 24, using a broad range of materials, for example, and without limitation, metals, ceramics, glass, and polymers.

Figure 2:
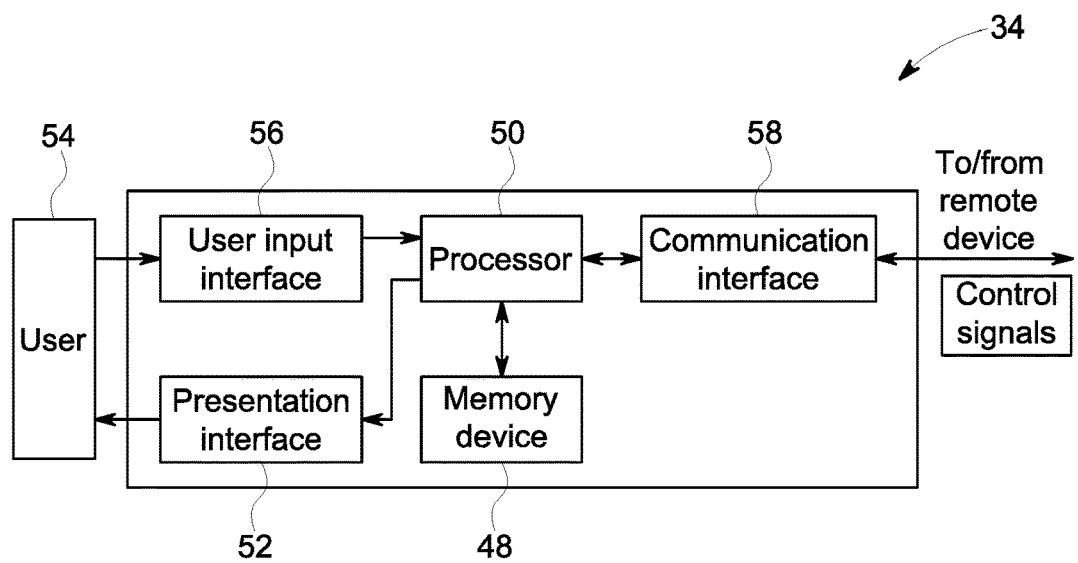
FIG. 2 is a block diagram of a controller that may be used to operate the additive manufacturing system shown in FIG. 1.

FIG. 2 is a block diagram of controller 34 that may be used to operate additive manufacturing system 10 (shown in FIG. 1). In the exemplary embodiment, controller 34 is any type of controller typically provided by a manufacturer of additive manufacturing system 10 to control operation of additive manufacturing system 10. Controller 34 executes operations to control the operation of additive manufacturing system 10 based at least partially on instructions from human operators. Controller 34 includes, for example, a 3D model of component 24 to be fabricated by additive manufacturing system 10. Operations executed by controller 34 include controlling power output of laser device 16 (shown in FIG. 1) and adjusting mounting system 32 and/or support structure 42, via actuator system 36 (all shown in FIG. 1) to control the scanning velocity of energy beam 28. Controller 34 is also configured to control scanning motor 18 to direct scanning mirror 20 to further control the scanning velocity of energy beam 28 within additive manufacturing system 10. In alternative embodiments, controller 34 may execute any operation that enables additive manufacturing system 10 to function as described herein.

In the exemplary embodiment, controller 34 includes a memory device 48 and a processor 50 coupled to memory device 48. Processor 50 may include one or more processing units, such as, without limitation, a multi-core configuration. Processor 50 is any type of processor that permits controller 34 to operate as described herein. In some embodiments, executable instructions are stored in memory device 48. Controller 34 is configurable to perform one or more operations described herein by programming processor 50. For example, processor 50 may be programmed by encoding an operation as one or more executable instructions and providing the executable instructions in memory device 48. In the exemplary embodiment, memory device 48 is one or more devices that enable storage and retrieval of information such as executable instructions or other data. Memory device 48 may include one or more computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Memory device 48 may be configured to store any type of data, including, without limitation, build parameters associated with component 24. In some embodiments, processor 50 removes or "purges" data from memory device 48 based on the age of the data. For example, processor 50 may overwrite previously recorded and stored data associated with a subsequent time or event. In addition, or alternatively, processor 50 may remove data that exceeds a predetermined time interval. In addition, memory device 48 includes, without limitation, sufficient data, algorithms, and commands to facilitate monitoring of build parameters and the geometric conditions of component 24 being fabricated by additive manufacturing system 10.

In some embodiments, controller 34 includes a presentation interface 52 coupled to processor 50. Presentation interface 52 presents information, such as the operating conditions of additive manufacturing system 10, to a user 54. In one embodiment, presentation interface 52 includes a display adapter (not shown) coupled to a display device (not shown), such as a cathode ray tube (CRT), a liquid crystal display (LCD), an organic LED (OLED) display, or an "electronic ink" display. In some embodiments, presentation interface 52 includes one or more display devices. In addition, or alternatively, presentation interface 52 includes an audio output device (not shown), for example, without limitation, an audio adapter or a speaker (not shown).

In some embodiments, controller 34 includes a user input interface 56. In the exemplary embodiment, user input interface 56 is coupled to processor 50 and receives input from user 54. User input interface 56 may include, for example, without limitation, a keyboard, a pointing device, a mouse, a stylus, a touch sensitive panel, such as, without limitation, a touch pad or a touch screen, and/or an audio input interface, such as, without limitation, a microphone. A single component, such as a touch screen, may function as both a display device of presentation interface 52 and user input interface 56.

In the exemplary embodiment, a communication interface 58 is coupled to processor 50 and is configured to be coupled in communication with one or more other devices, such as laser device 16, and to perform input and output operations with respect to such devices while performing as an input channel. For example, communication interface 58 may include, without limitation, a wired network adapter, a wireless network adapter, a mobile telecommunications adapter, a serial communication adapter, or a parallel communication adapter. Communication interface 58 may receive a data signal from or transmit a data signal to one or more remote devices. For example, in some embodiments, communication interface 58 of controller 34 may transmit/receive a data signal to/from actuator system 36.

Presentation interface 52 and communication interface 58 are both capable of providing information suitable for use with the methods described herein, such as, providing information to user 54 or processor 50. Accordingly, presentation interface 52 and communication interface 58 may be referred to as output devices. Similarly, user input interface 56 and communication interface 58 are capable of receiving information suitable for use with the methods described herein and may be referred to as input devices.

Figure 3:
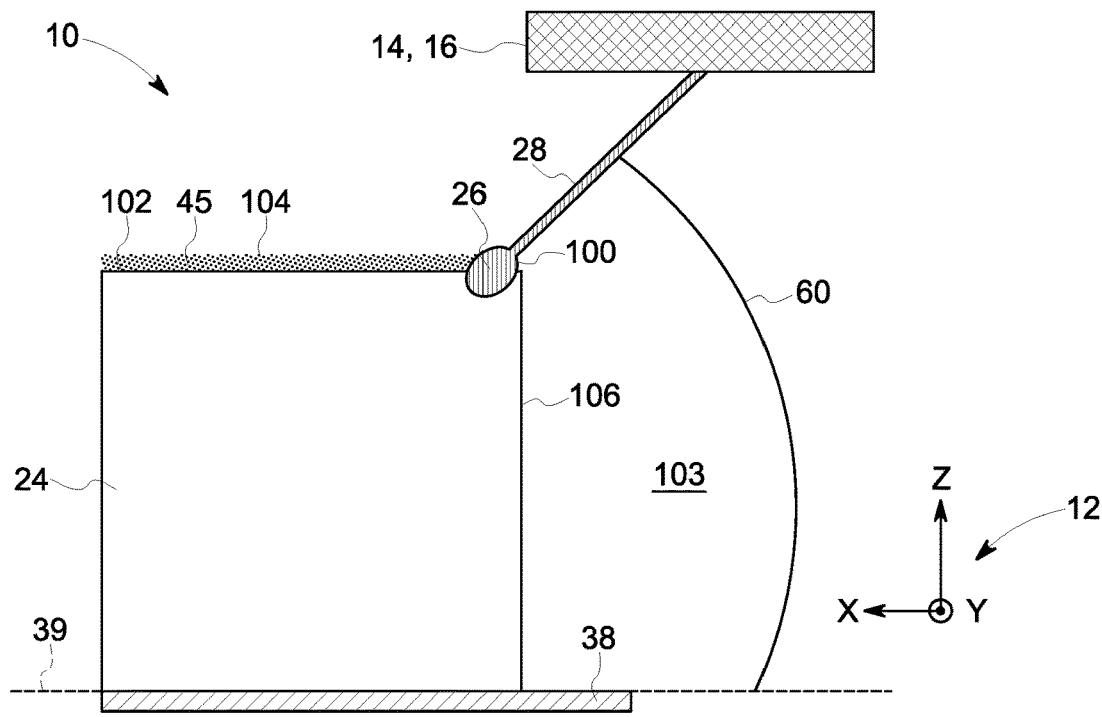
FIG. 3 is a section schematic view of a portion of an exemplary component illustrating an exemplary energy beam and an exemplary consolidation device that may be used to fabricate the component.

FIG. 3 is a section schematic view of a portion of component 24 (shown in FIG. 1) illustrating energy beam 28 and consolidation device 14 during fabrication of a build layer retainer 100 positioned along a top surface 102 of component 24 and facing a substantially particle-free region 103. With reference to FIGS. 1-3, in the exemplary embodiment, controller 34 controls consolidation device 14, based on a build file to consolidate a first plurality 104 of particles 45 along scan path 40 to form at least a portion of component 24. In the exemplary embodiment, consolidation device 14 includes laser device 16 that is configured to emit an energy beam 28. Controller 34 is configured to direct energy beam 28 to be incident on first plurality 104 of particles 45 along scan path 40 at a consolidation angle 60 of between zero degrees and ninety degrees, relative to build platform plane 39. In the exemplary embodiment, consolidation angle 60 is maintained between seventy-five degrees and ninety degrees during fabrication of component 24 to facilitate fabricating component 24, including build layer retainer 100, by using melt pool surface tension effects to reduce the effects of particle 45 starvation at a radially outer portion of top surface 102 and an outer surface 106 during formation of component 24.

In the exemplary embodiment, controller 34 may control consolidation device 14 to direct energy beam 28 to be incident on outer surface 106 at any angle relative to build platform plane 39 to facilitate generating a desired surface finish of outer surface 106. In the exemplary embodiment, consolidation device 14 is illustrated as being positioned to direct energy beam 28 to be incident on component 24 from a position overlying substantially particle-free region 103. In an alternative embodiment, consolidation device 14 may be positioned to direct energy beam 28 to be incident on component 24 from a position overlying component 24. In another alternative embodiment, consolidation device 14 may be controlled to direct energy beam 28 to consolidate any portion of component 24 that facilitates fabrication of component 24 using additive manufacturing system 10 as described herein.

Figure 4:
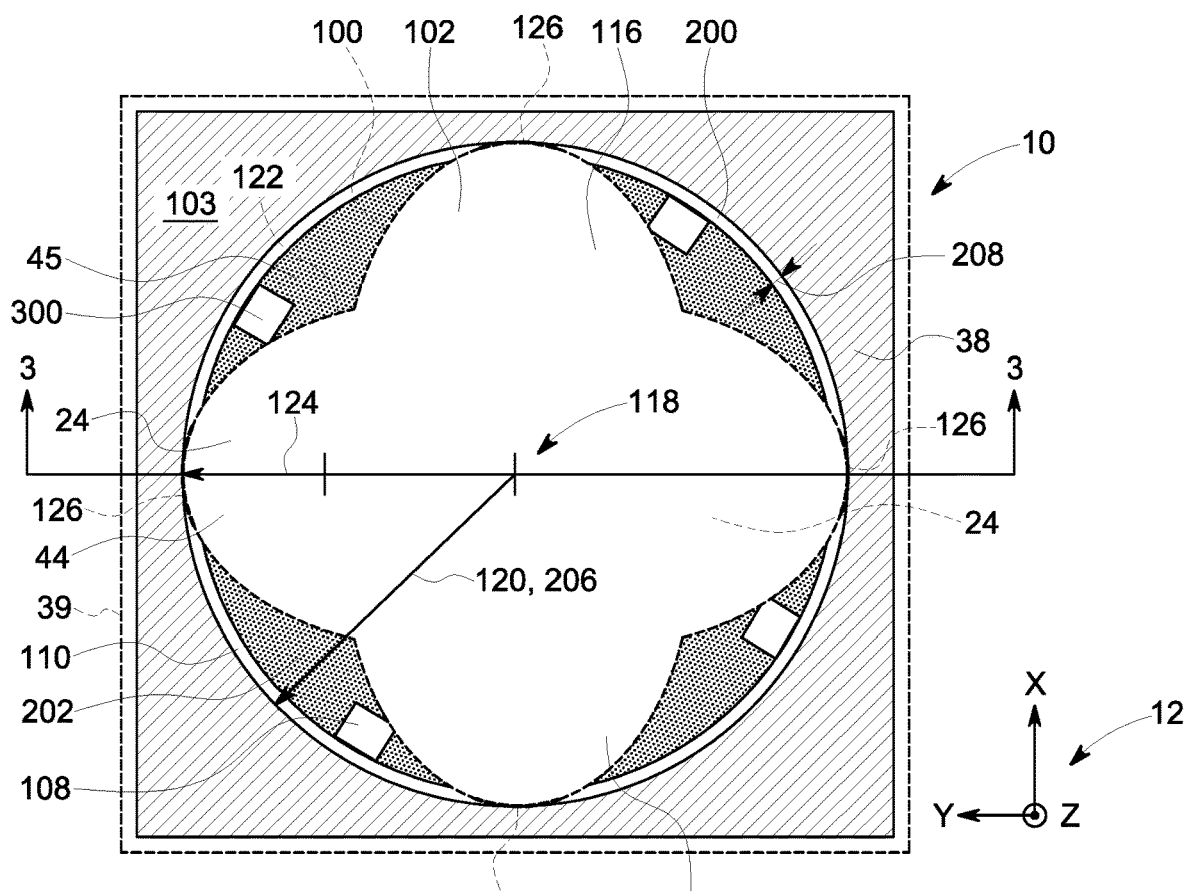
FIG. 4 is a plan schematic view of the component shown in FIG. 3.
Figure 5:
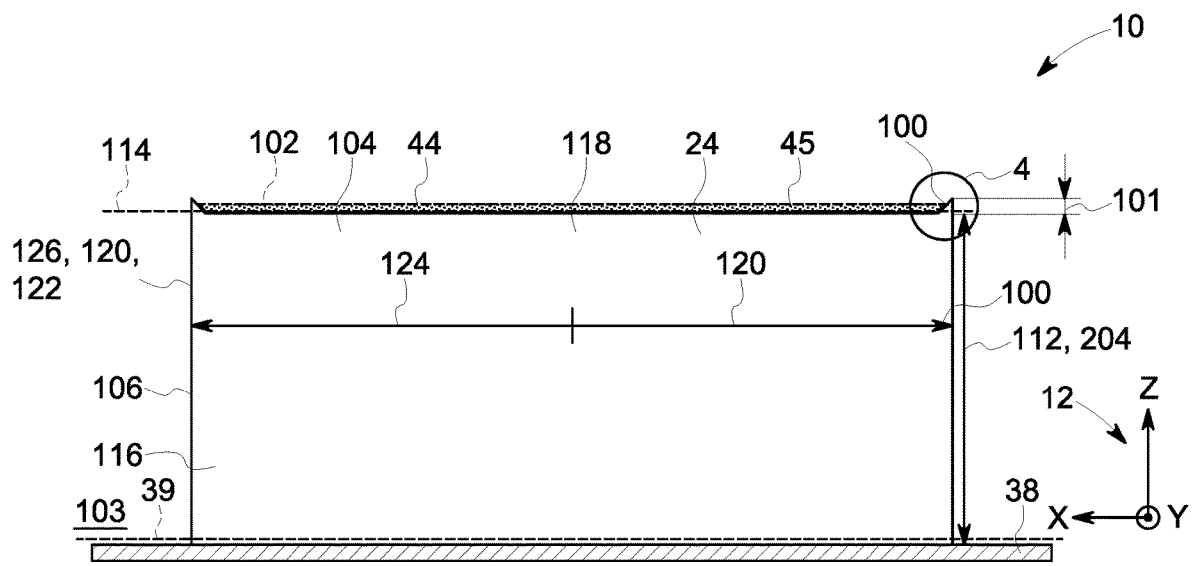
FIG. 5 is a section side schematic view of the component shown in FIG. 4.
Figure 6:
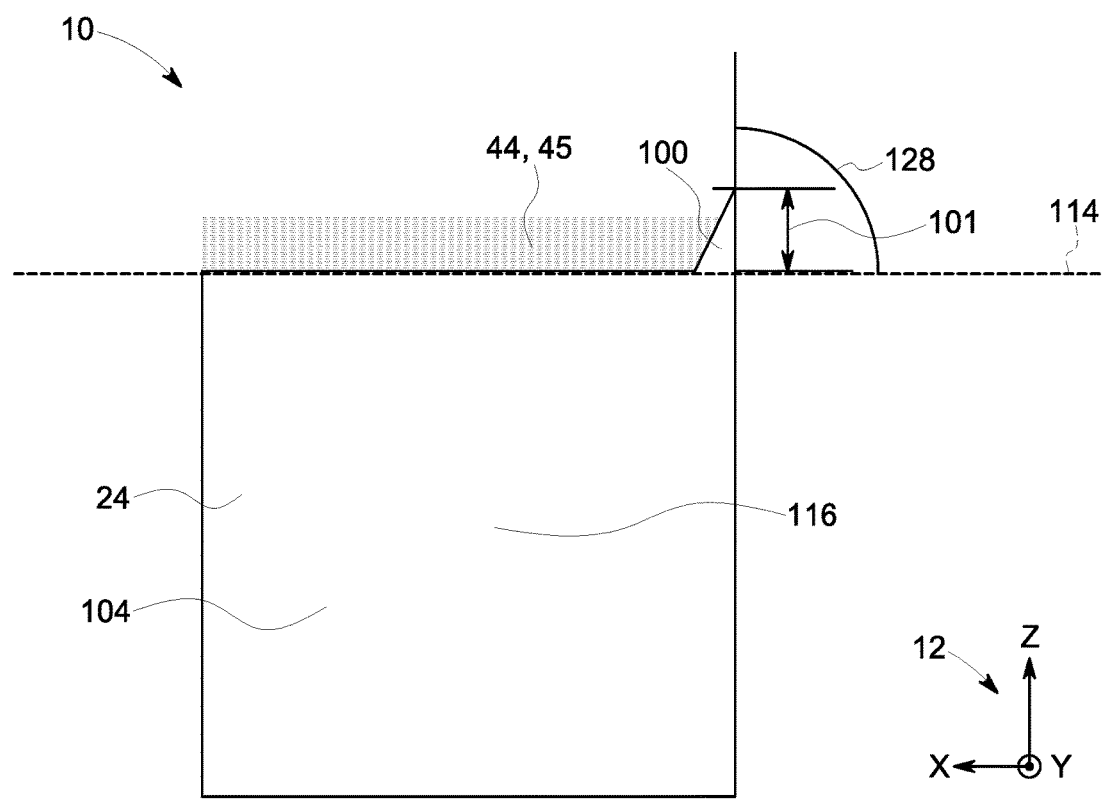
FIG. 6 is an enlarged schematic view of region 4 shown in FIG. 5 illustrating an exemplary build layer retainer that may be used with the component shown in FIG. 4.

FIG. 4 is a plan schematic view of component 24. FIG. 5 is a section side schematic view of component 24 taken along line 3-3 (shown in FIG. 4). FIG. 6 is an enlarged schematic view of region 4 (shown in FIG. 5) illustrating build layer retainer 100 that may be used with component 24 (shown in FIG. 4). In the exemplary embodiment, component 24 and additive manufacturing system 10 are configured to facilitate reducing the quantity of particles 45 required for operation of additive manufacturing system 10 and to facilitate improving the quality of component 24. In the exemplary embodiment, additive manufacturing system 10 includes component 24 positioned on build platform 38, four component supports 108, and four particle containment walls 110. In an alternative embodiment, additive manufacturing system 10 may not include at least one of build layer retainer 100, component supports 108 and particle containment walls 110. In the exemplary embodiment, at least a portion of component 24, build layer retainer 100, and particle containment walls 110 are generally circular. In alternative embodiments, component 24, build layer retainer 100, component supports 108, and particle containment wall 110 may be any shape and be present in any quantity that facilitates fabrication of component 24 as described herein.

The configuration and arrangement of additive manufacturing system 10 is merely an example, and those of skill in the art will appreciate that additive manufacturing system 10 may have any configuration that enables additive manufacturing system 10 to function as described herein.

In the exemplary embodiment, component 24 is substantially solid and is fabricated from first plurality 104 of particles 45 consolidated together using a consolidation process using a consolidation device, such as consolidation device 14. More specifically, component 24 includes top surface 102 spaced apart from build platform 38, outer surface 106, and build layer retainer 100. In the exemplary embodiment, component 24 extends along the Z-direction between build platform 38 and top surface 102 by a component height 112. Top surface 102 defines a top surface plane 114. In the exemplary embodiment, component 24 includes four lobes 116 extending from a center portion 118, and extends in an XY plane by an outer diameter 120. Outer surface 106 defines an outer profile 122 including a lobe end radius 124 defining a radially outermost profile 126 of each lobe 116. In alternative embodiments, component 24 may have any configuration and have any shape that facilitates fabrication of component 24 as described herein.

In the exemplary embodiment, particle containment walls 110 are substantially solid and are fabricated from a second plurality 200 of particles 45 consolidated together using a consolidation device, such as consolidation device 14. Particle containment walls 110 are coupled to outer surface 106 and are configured to retain a plurality of particles 45 between particle containment walls 110 and at least a portion of outer surface 106, defining particle retention cavities 202. More specifically, each particle containment wall 110 extends along the Z-direction from build platform 38 by a wall height 204 and extends between adjacent lobes 116 of component 24, defining a wall radius 206 substantially similar to lobe end radius 124. In the exemplary embodiment, particle containment walls 110 have a wall thickness 208 and are continuous with radially outermost profile 126 of each lobe 116. In alternative embodiments, particle containment walls 110 may be continuous with at least a portion of component 24. In further alternative embodiments, particle containment walls 110 may extend between any portion of component 24 and have any configuration that facilitates fabrication of component 24 by additive manufacturing system 10 as described herein.

In the exemplary embodiment, component supports 108 are substantially solid and are fabricated from a third plurality 300 of particles 45 consolidated together using a consolidation device, such as consolidation device 14. In the exemplary embodiment, component supports 108 extend from build platform 38 along the Z direction by a support height (not labeled in figures). Each component support 108 is coupled to component 24 and a particle containment wall 110 and is configured to support at least a portion of component 24 during the manufacturing process. In the exemplary embodiment, component supports 108 are positioned within particle retention cavities 202, have a rectangular cross-sectional area, and extend along the Z-direction from build platform 38 to top surface plane 114. In alternative embodiments, component supports 108 may extend along any direction by any support height and may be coupled to any portion of component 24 that facilitates fabrication of component 24 as described herein.

In the exemplary embodiment, build layer retainer 100 is configured to retain a plurality of particles 45 along top surface 102, is substantially solid, and is fabricated from a plurality of particles 45 consolidated together using a consolidation process using a consolidation device, such as consolidation device 14, as described herein. More specifically, build layer retainer 100 extends from top surface 102 along the Z-direction substantially orthogonal to top surface plane 114 by a retainer height 101 and facilitates retaining at least a portion of build layer 44 overlying top surface 102 to facilitate improving the formation of component 24. In the exemplary embodiment, build layer retainer 100 extends from a radially outer portion of component 24 along outer profile 122 at a retainer angle 128 of approximately ninety degrees relative to top surface plane 114. In alternative embodiments, build layer retainer 100 may extend from component 24 at any angle between approximately ninety degrees and forty-five degrees relative to top surface plane 114. In another alternative embodiment, build layer retainer 100 may also extend from particle containment walls 110. In further alternative embodiments, build layer retainer 100 may extend from any portion of component 24, particle containment walls 110 and component supports 108 in any manner that facilitates fabrication of component 24 by additive manufacturing system 10 as described herein.

In the exemplary embodiment, portions of outer surface 106 face a substantially particle-free region 103 of build platform 38. More specifically, radially outermost profiles 126 of outer profile 122 face substantially particle-free region 103 and are fabricated by additive manufacturing system 10 using the processes described herein. In alternative embodiments, the entirety of outer profile 122 may face substantially particle-free region 103.

Figure 7:
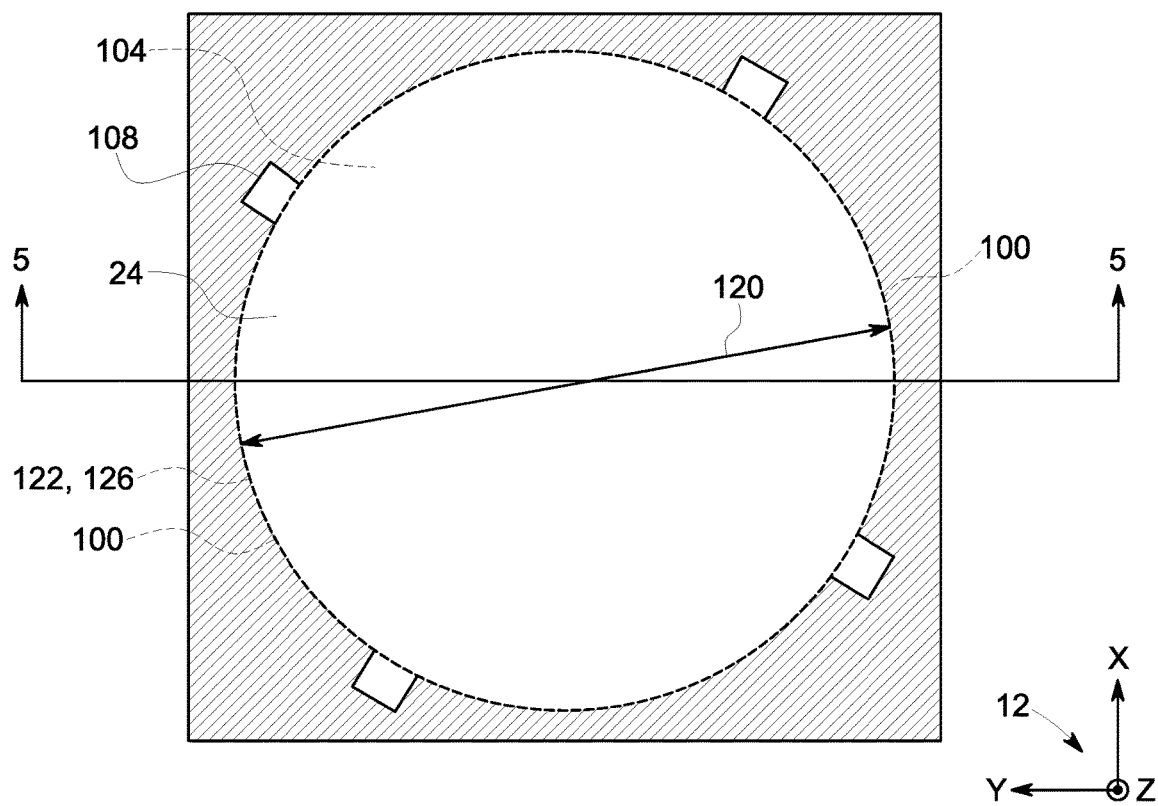
FIG. 7 is a plan schematic view of an alternative embodiment of the component shown in FIG. 4.
Figure 8:
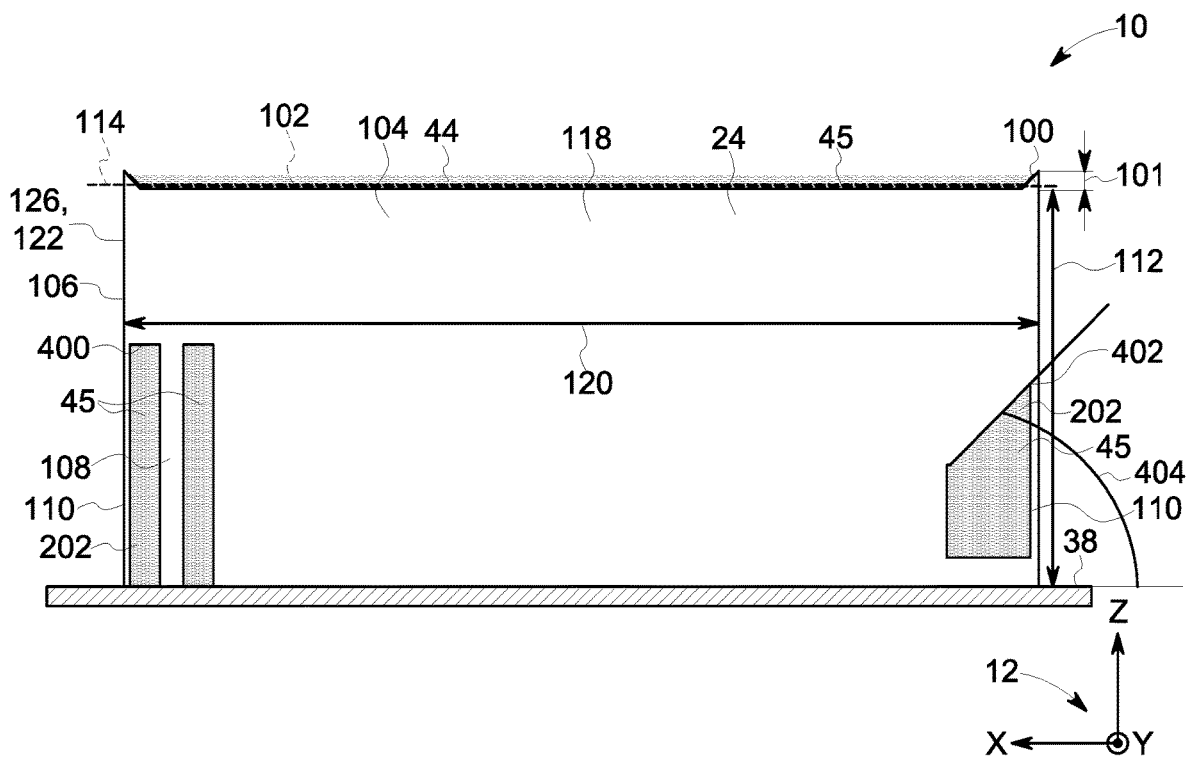
FIG. 8 is a section side schematic view of the component shown in FIG. 7.
Figure 9:
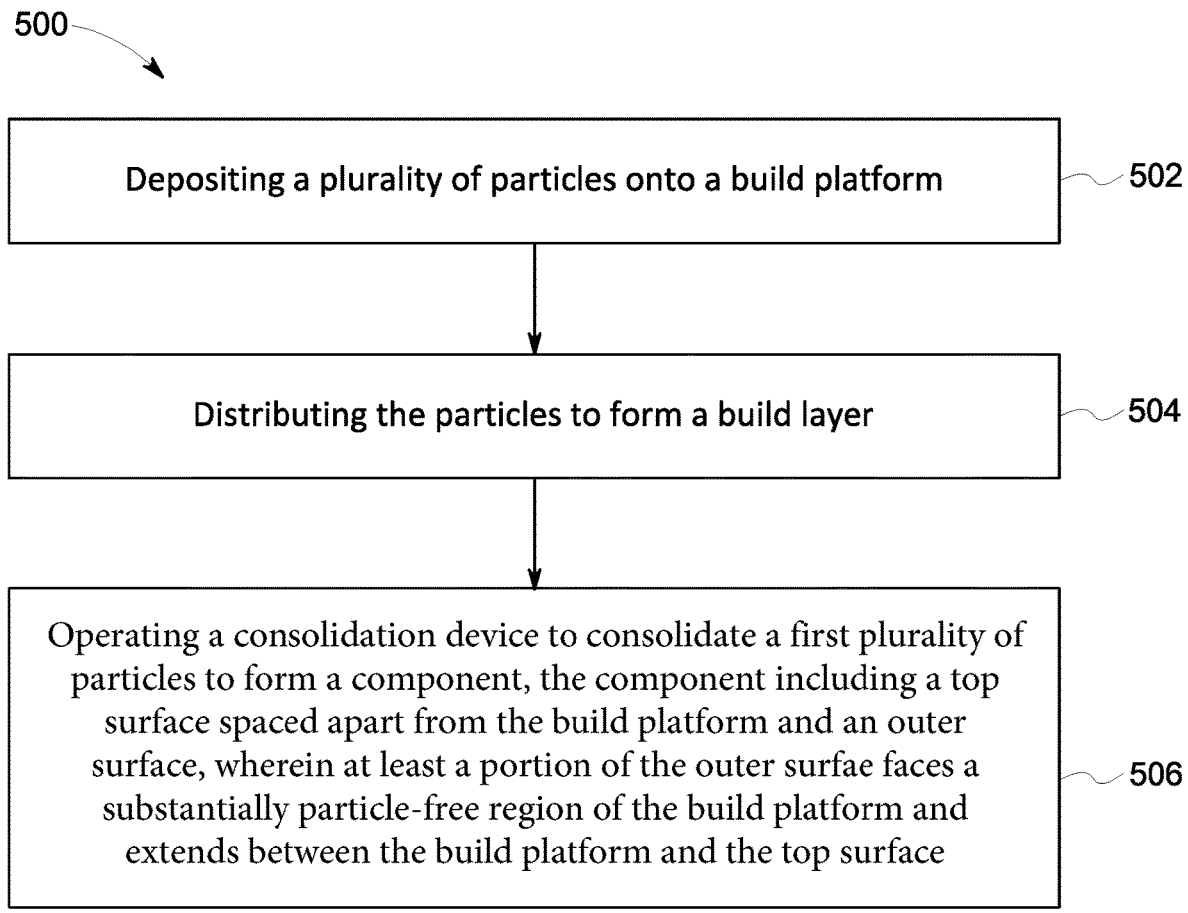
FIG. 9 is a flowchart of an exemplary method that may be used to fabricate the component shown in FIG. 4.

FIG. 7 is a section side schematic view of build platform 38 and an alternative embodiment of component 24 (shown in FIG. 4). FIG. 8 is a section side schematic view of component 24 taken along line 5-5 (shown in FIG. 7). The embodiment shown in FIG. 7 is substantially identical to the embodiment shown in FIGS. 4-6, except component 24 includes component supports 108 positioned along outer profile 122, particle retention cavities 202 that are surrounded by consolidated portions of component 24, component supports 108, and particle containment walls 110, and outer profile 122 that faces substantially particle-free region 103. In the exemplary embodiment, four component supports 108 extend along outer surface 106 in the Z-direction from build platform 38 to top surface plane 114. A component support 108 extends from build platform 38 to an overhang 400 of component 24 within a particle retention cavity 202. An angled portion 402 of component 24 extends through a particle retention cavity 202 to a particle containment wall 110 at an angled portion angle 404. In further alternative embodiments, component supports 108 and particle containment walls 110 may be arranged in any manner and in any quantity that facilitates fabrication of component 24 using additive manufacturing system 10 as described herein.

In the exemplary embodiment, component support 108 facilitates consolidation of particles 45 to form overhang 400. More specifically, build angles of between approximately zero degrees and forty-five degrees relative to build platform plane 39 may be facilitated by using component supports 108 to stabilize the portions of component 24 being consolidated from particles 45. In an alternative embodiment, component support 108 may extend between any portion of component 24 to any other portion of component 24. In further alternative embodiments, overhang 400 may be fabricated while facing substantially particle-free region 103.

In the exemplary embodiment, angled portion 402 of component 24 extends through particle retention cavity 202 to particle containment wall 110 at an angle of approximately forty-five degrees relative to build platform plane 39. In alternative embodiments, angled portion 402 may extend at any angle between approximately ninety degrees and forty-five degrees relative to build platform plane 39 without requiring component support 108 to be fabricated to support angled portion 402. In further alternative embodiments, angled portion 402 may face substantially particle-free region 103 during fabrication of angled portion 402.

FIG. 8 is a flow chart illustrating a method 500 for fabricating component 24. Referring to FIGS. 1-8, method 500 includes depositing 502 a plurality of particles 45 onto a build platform 38. Method 500 also includes distributing 504 the plurality of particles 45 to form a build layer 44. Method 500 further includes operating 506 a consolidation device 14 to consolidate a first plurality 104 of particles 45 to form a component 24. Component 24 includes a top surface 102 spaced apart from build platform 38 and an outer surface 106. Outer surface 106 extends between build platform 38 and top surface 102 and at least a portion of outer surface 106 faces a substantially particle-free region 103 of build platform 38.

The embodiments described herein include an additive manufacturing system including at least one consolidation device configured to direct at least one energy beam to generate a melt pool in a layer of particles, a build platform, and a component formed on the build platform. The component includes a top surface spaced apart from the build platform and an outer surface. The outer surface extends between the build platform and the top surface, and at least a portion of the outer surface faces a substantially particle-free region of the build platform. In some embodiments, a build layer retainer is configured to retain at least a portion of the build layer along the top surface. The additive manufacturing system and the configuration of the component facilitates improving additively manufacturing components without surrounding an outer face of the component with particles to facilitate improving the quality of an additively manufacturing component and reducing the cost to additively manufacture the component.

An exemplary technical effect of the methods, systems, and apparatus described herein includes at least one of: a) improving coverage of a component with particulate matter during the recoating process, b) reducing the amount of particulate matter required for additively manufacturing a component, c) improving dimensional consistency of a component, d) improving a surface finish of a component, and e) reducing the cost of additively manufacturing a component.

Exemplary embodiments of additive manufacturing systems and components configured to facilitate fabrication of components having at least a portion of an outer face exposed to a substantially particle-free region of the additive manufacturing system are described above in detail. The additive manufacturing systems and components, and methods of using and manufacturing such systems are not limited to the specific embodiments described herein, but rather, components of systems and/or steps of the methods may be utilized independently and separately from other components and/or steps described herein. For example, the methods may also be used in combination with other additive manufacturing systems, and are not limited to practice with only the additive manufacturing systems, and methods as described herein. Rather, the exemplary embodiment can be implemented and utilized in connection with many other electronic systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of fabricating a component, said method comprising:
  depositing particles onto a build platform;
  distributing the deposited particles to form an initial build layer;
  operating at least one consolidation device to consolidate at least a portion of the deposited particles to form an initial layer of the component, wherein the consolidation device comprises a laser device and a scanning device;
  repeating the steps of depositing particles, distributing the deposited particles, and operating the at least one consolidation device to form at least a portion of the component, the at least portion of the component including the initial build layer and at least one subsequent build layer, the at least a portion of the component including an outer surface defining an outer perimeter of the component, wherein at least a portion of the outer surface faces a substantially particle-free region of the build platform, wherein forming each subsequent build layer of the at least one subsequent build layer comprises:
    depositing top surface particles on the initial build layer or a previous layer of the at least portion of the component;
    distributing the top surface particles to form a top surface build layer; and
    operating the at least one consolidation device to consolidate a first plurality of the top surface particles along a scan path to form a top surface of the subsequent build layer of the component and a build retainer of the subsequent build layer, the top surface spaced apart the build platform such that the outer surface extends between the build platform and the top surface, the build layer retainer extending from at least a portion of the top surface and around the outer perimeter, wherein the build layer retainer is configured to retain at least a portion of the top surface build layer along the top surface; and
  operating the at least one consolidation device to consolidate at least a portion of the deposited particles, a second plurality of the top surface particles, or both along a scan path to form at least one particle containment wall, wherein the at least one particle containment wall is coupled to the outer surface of the component and is configured to retain a plurality of particles within at least one particle retention cavity between the at least one particle containment wall and at least a portion of the outer surface.

2. The method in accordance with claim 1, wherein operating the at least one consolidation device further includes directing a laser beam from the laser device to be incident on the first plurality of the top surface particles along the scan path at a consolidation angle of between zero degrees and ninety degrees relative to a plane defined by the top surface of the component.

3. The method in accordance with claim 2, wherein the laser beam is directed to be incident on the first plurality of top surface particles along the scan path at a consolidation angle of between seventy-five degrees and ninety degrees.

4. The method in accordance with claim 2, wherein the consolidation device is positioned to direct the laser beam to be incident on the component from a position overlying the component.

5. The method in accordance with claim 2, wherein the at least one consolidation device is positioned to direct the laser beam to be incident on the component from a position overlying the substantially particle-free region.

6. The method in accordance with claim 1, further comprising: operating the at least one consolidation device to direct a laser beam from the laser device to be incident on the outer surface at a consolidation angle of between zero degrees and ninety degrees relative to a plane defined by the top surface of the component.

7. The method in accordance with claim 1, wherein the build layer retainer extends from the at least a portion of the top surface at an angle of between ninety degrees and forty-five degrees relative to a plane defined by the build platform.

8. The method in accordance with claim 1, wherein operating the at least one consolidation device to form at least one particle containment wall includes forming the at least one particle containment wall, wherein an outer profile of at least a portion of the at least one particle containment wall is continuous with an outer profile of at least a portion of the outer surface.

9. The method in accordance with claim 1, further comprising:
operating the at least one consolidation device to consolidate a third plurality of the top surface particles, at least a portion of the deposited particles, or both along a scan path to form at least one component support, wherein the at least one component support is coupled to the component within the at least one particle retention cavity and is configured to support at least a portion of the component.

10. The method in accordance with claim 1, further comprising: operating the at least one consolidation device to consolidate a third plurality the top surface particles, at least a portion of the deposited particles, or both along a scan path to form at least one component support, wherein the at least one component support is coupled to the outer surface of the component and is configured to support at least a portion of the component.

11. The method in accordance with claim 10, wherein operating the at least one consolidation device to form at least one component support includes forming the at least one component support such that the at least one component support extends between a first portion of the component and a second portion of the component.

* * * * *